June 18, 1968 R. J. HOLTON 3,388,732

SELF-THREADING FASTENING DEVICE

Filed July 31, 1967

INVENTOR
ROBERT J. HOLTON

BY Teare, Teare & Sammon

ATTORNEY

United States Patent Office 3,388,732
Patented June 18, 1968

3,388,732
SELF-THREADING FASTENING DEVICE
Robert J. Holton, Rocky River, Ohio, assignor to Tinnerman Products, Inc., Cleveland, Ohio, a corporation of Ohio
Filed July 31, 1967, Ser. No. 657,242
13 Claims. (Cl. 151—41.75)

ABSTRACT OF THE DISCLOSURE

A self-threading fastening device for use with a threaded member including a head having an opening and a tubular hub extending from the head with a bore disposed in alignment with the opening in the head for receiving a threaded member therein. A deformable pilot member projecting into the bore of the hub for self-threading deformation upon turning movement of the threaded member, and a shoulder member adjacent the open end of the hub for interlocking engagement with the threaded member in the applied fastening position of the device.

Background of the invention

The present invention relates to a self-threading fastening device for use in assembly with a threaded member, such as a stud, screw, bolt or the like, for securement of various component parts, such as moldings, trim strips or the like, to an apertured support member.

Heretofore, considerable difficulty has been encountered in the assembly of a threaded nut-type retainer with threaded members, such as with screws, studs, bolts or the like, particularly in the automotive field where mass assembly-line procedures are employed for assembly of the component parts. In this connection, it has been experienced that considerable cross-threading in the assembly of threaded, mating parts, such as for instance, in the assembly of a 5/16-in. screw having 24 threads per inch with a 5/16-in. nut having 24 threads per inch. Such cross-threading has resulted in failure of the retainer assembly, particularly with rapid and high quantity production thereof.

One method which has been employed to reduce such cross-threading has been to assemble threaded, but non-mating parts, such as by threading a 5/16-in. screw having 18 threads per inch into a 5/16-in. nut having 24 threads per inch. It has been found, however, that such arrangement does not provide adequate holding power on the parts, particularly under severe load conditions. Other attempts have been made to overcome such difficulties by driving a threaded member, such as a screw or bolt, into an unthreaded nut retainer. In such cases, however, it has been found that in such retainers no effective control can be maintained during threading of the parts so that the threaded member is driven at an angle which results in cocking and misalignment thereof with consequent loss of holding power and ultimate failure of the assembly.

The fastening device of the present invention constitutes an improvement over the device described in the applicant's co-pending application Ser. No. 509,950, filed Nov. 26, 1965, to Robert J. Holton. In such co-pending application there is described a fastening device which overcomes the aforementioned and other related disadvantages of such heretofore known types of fastening retainers.

Summary of the invention

The present invention relates to a self-threading metal fastening device for assembly with a threaded member which comprises a head having an opening and a tubular, threadless hub extending from the head having a bore disposed in alignment with the opening in the head for receiving a threaded member therein. The hub includes a deformable pilot member which projects into the bore and which engages initial threads on the threaded member to maintain axial alignment of the threaded member upon turning self-threading movement through the hub. The hub further includes adjacent its end an inwardly extending shoulder portion which engageably interlocks with initial threads on the threaded member to increase the gripping and holding power on the threaded member. The shoulder portion has a reduced transverse dimension as compared to the transverse dimension of the hub so as to provide a progressively increased resistance to turning movement of the threaded member so that the hub is axially collapsed toward the head to further increase the gripping and holding power on the threaded member in the applied fastening positioning of the device.

Description of the preferred embodiments

Figure 1:
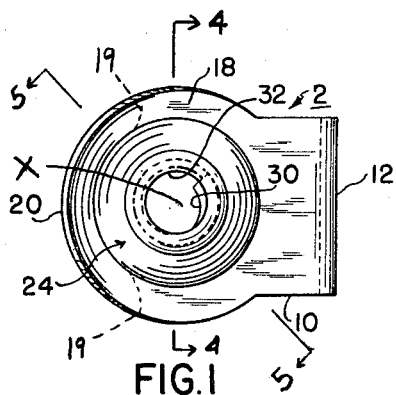
FIG. 1 is a bottom plan view of the fastening device made in accordance with the present invention.
Figure 2:
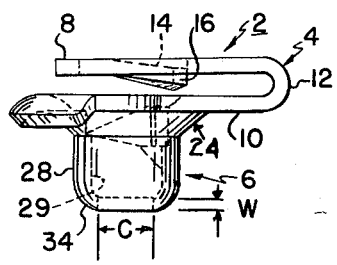
FIG. 2 is a side elevation view of the fastening device shown in FIG. 1.
Figure 3:
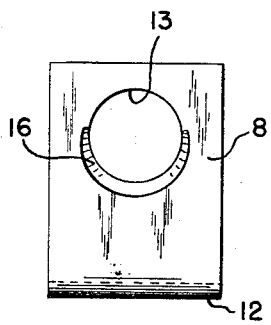
FIG. 3 is a top plan view showing the resilient arm construction of the fastening device of FIG. 2, but with the lower portions of the device removed for purposes of clarity.
Figure 6:
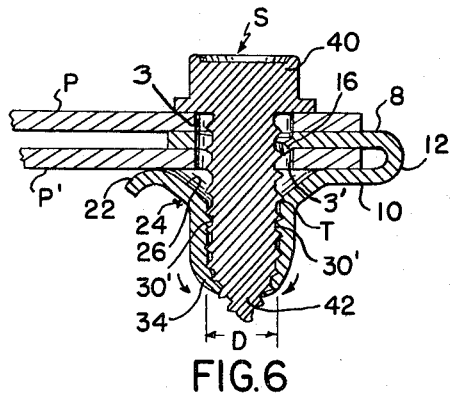
FIG. 6 is a vertical section view showing the assembly of the fastening device of the present invention in applied position with a threaded member for joining two apertured support panels in superposed relationship.

Referring again to thhe drawings, and in particular to FIGS. 1 to 3 thereof, there is illustrated one form of the fastening device, designated generally at 2, which may be made from a piece or strip of metallic material, such as cold-rolled steel. In the form shown, the device comprises a head 4 from which extends a tubular hub 6 for assembly with a pair of apertured 3 and 3' support members P and P', as shown in FIG. 6.

In the embodiment shown, the head 4 includes a resilient spring-arm 8 which is connected to a base 10 by an arcuate bight portion 12. The arm 8 preferably extends slightly angularly inwardly from the bight portion 12 to provide a generally U-shaped clip for insertion over the marginal edge of a support member, such as the panel P', shown in FIG. 6. The arm 8 is provided with an opening 13, which may be generally circular in shape adapted to receive therethrough a threaded member S, such as a stud, bolt, screw or the like. As best seen in FIGS. 2 and 3, the arm 8 is provided with a depressed arcuate portion which is struck downwardly, as at 14, to provide a generally semi-circular (FIG. 3) projection 16 which extends angularly downwardly from the general plane of the arm 8. This arrangement provides an overlying gripping engagement adjacent the margin of the aperture 3' in the support member, such as the panel P', to prevent lateral shifting movement of the device with respect to the panel in the final installed position thereof. The diameter A of the opening 13 is preferably slightly larger than the maximum transverse dimension D of the threaded member S adapted to be inserted therethrough. For example, the diameter A may be about 0.343 inch plus or minus 0.15 inch when a 5/16-in. screw is employed.

The base 10 extends in a horizontal direction from the bight portion 12 and includes an enlarged section 18 (FIG. 1) which may have a generally circular shape in top plan. Section 18 is formed so as to provide a downwardly bent flange 20 commencing at oppositely disposed points, as at 19, off-set to one side of the rotational axis X of the device. This flange 20 has an arcuate shape in transverse cross section defining concavo-convex upper and lower surfaces, as at 22 and 23. By this arrangement, the arcuate flange 20 provides a camming surface, such as 22, which engages the underside of the support panel P' to facilitate application of the device thereto, as shown in FIG. 6.

The enlarged section 18 of the base 10, in the form shown, may be formed in its central area with a downwardly extending endless skirt portion 24. The skirt portion 24 includes an endless side wall 26 which defines an inverted, generally frusto-conical shape that tapers downwardly and inwardly in a direction away from the base 10. The skirt portion 24 integrally joins the tubular hub 6 to the base 10 of the head 4 so as to enable axial collapsing movement of the hub 6 in a direction toward the head, as will be more fully described herein.

As best seen in FIGS. 2 and 3, the resilient arm 8 is preferably polygonal in top plan, such as rectangular, and may be foreshortened in length with respect to the base 10. The opening 13 in the arm 8 is concentrically aligned with respect to the frusto-conical opening defined by the side wall 26 of the skirt portion 24 so that a threaded member S may be readily inserted therethrough and into the tubular hub 6.

The tubular hub 6 extends downwardly from and is made integral with the skirt portion 24. The tubular hub is defined by an endless side wall 28 which is smooth or unthreaded on its interior surface to provide a substantially threadless bore 29 extending therethrough. The hub is preferably made by a metal extruding operation, but may be made by other metal forming techniques as are known in the art. The bore 29 has a generally circular shape in transverse section and has a diameter which is smaller than the maximum transverse dimension D of the threaded member S. By this arrangement, the threaded member can be inserted into the bore 29 for self-threading engagement into the material of the side wall 28 defining the smooth interior surface of the bore 29.

The tubular hub 6 may be formed so that its outer periphery assumes a slightly cone-shaped configuration having its outer surface tapering gradually inwardly toward its outer end, but with the interior defined by the side wall 28 being substantially of a cylindrical shape. In such case, the wall thickness of the side wall 28 is greatest at the juncture with the base 10 and gradually reduces in thickness in a direction toward the end thereof. In this connection, however, the side wall 28 could also be cylindrical on the interior and the exterior so that the thickness of the wall would be substantially uniform throughout a major portion of its length.

For purposes of definition, the term "major diameter" of the threaded member S when used herein refers to the largest diameter D of the screw including the threads T. Moreover, the threaded member S has generally helical threads T extending longitudinally thereof with a tapered leading entry end 42 portion, as best seen in FIG. 6.

Figure 4:
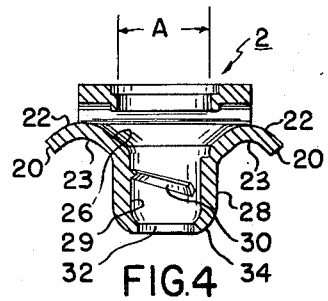
FIG. 4 is a vertical section view of the device taken along the plane of line 4—4 of FIG. 1.
Figure 5:
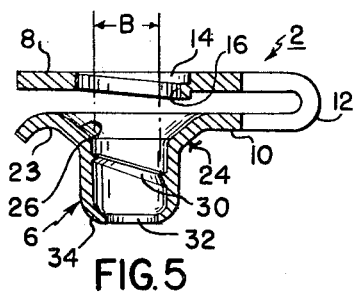
FIG. 5 is a vertical section view of the device taken along the plane of line 5—5 of FIG. 1.

As best seen in FIGS. 4 and 6, the tubular hub 6 is provided with deformable pilot means of the type described in the applicant's aforementioned application Ser. No. 509,950. As shown, the deformable pilot means includes a generally helical rib 30 formed from the material of the side wall 28 of the hub 6. The rib 30 is helically inclined so as to lie in a plane which is disposed at an acute angle with respect to the rotational axis X of the bore 29. Preferably, the angle of inclination of the rib 30 corresponds generally to the angle of inclination of the threads T on the threaded member and extends in the same direction as the pitch angle of the threads T on the threaded member. The outer peripheral surface of the rib 30 may be roughened or ragged (not shown) to facilitate picking-up of the initial threads T on the threaded member to provide a pilot therefor during turning movement of the threaded member S through the bore in the manner of the co-pending application Ser. No. 509,950. Preferably, the maximum transverse dimension B between opposed points on the rib 30 is less than the maximum transverse dimension D of the threaded member S. For a 5/16-in. screw, the dimension B may be about 0.200 inch plus or minus 0.015 inch. By this arrangement, the rib 30 effectively picks up the initial threads T on the threaded member to prevent cocking or misalignment thereof, whereafter, the rib 30 is progressively deformed in a downwardly helical and axial direction upon turning self-threading movement of the threaded member S through the bore 29 in the hub 6.

In accordance with the invention, the end of the tubular hub 6 remote from the head 4 is provided with a novel locking means. In the form shown, such locking means comprises a radially inwardly extending or shoulder portion 34 which forms a continuation of the side wall 28 of the tubular hub 6. Accordingly, the shoulder portion 34 is preferably of an endless construction defining an opening 32 in the end of the hub 6. The opening 32 is preferably circular in shape and is disposed in concentric relationship with respect to the bore 29 in the hub 6. The maximum transverse dimension (diameter) C of the opening 32 is preferably less than the maximum transverse dimension D of the threaded member S. Preferably, this dimension for a 5/16-in. threaded member is about 0.228 inch plus or minus 0.015 inch. Accordingly, both the maximum transverse dimensions B and C of the pilot rib 30 and the shoulder portion 34 is less than the maximum transverse dimension D of the threaded member S. For example, with a 5/16-in. threaded member S the ratio of the dimensions B and C may be about 1:1. In the form shown, the axial thickness W of the shoulder portion 34 is less than the maximum transverse thickness of the side wall 28 of the tubular hub 6 throughout a major portion of the length of the side wall 28. Preferably, the thickness W may be about 0.045 inch plus or minus 0.015 inch with the thickness of the major portion of wall 28 being about 0.055 inch plus or minus 0.015 inch. Accordingly, the shoulder portion 34 tapers gradually downwardly and inwardly toward the rotational axis X of the device in a direction away from the side wall 28 of the tubular hub 6. By this arrangement, the shoulder portion 34 effectively engages the initial threads T on the threaded member so as to increase the resistance to driving of the threaded member S through the bore 29. Accordingly, in the final applied fastening position, the shoulder portion 34 is drawn radially into interlocking engagement between the respective threads T on the threaded member S to provide a threadlock thereon, as will be hereinafter more fully described.

In FIG. 6 there is shown a typical application of the fastening device 2 for joining together two apertured panels P and P' in superposed relationship. In assembly, the head 4 of the fastening device is slipped over the marginal edge of the panel P' so that the opening 13 in the arm 8 is in general alignment with the aperture 3' in the panel. In this position, the downwardly extending projection 16 is disposed interiorly of the aperture 3' in the panel P' so as to prevent dislodgment of the fastening device in this initially installed position. The other panel P is then disposed over the resilient arm 8 with the aperture 3 in the panel disposed in alignment with the opening 13 in the arm. The threaded member S may then be inserted through the registered apertures 3 and 3' in the panels P and P' and through the opening 13 in the arm 8 and into the bore 29 of the tubular hub 6. As the threaded member S is turned into the bore 29, the threads will initially engage the pilot rib 30 and will, thereafter, automatically cut threads in the smooth interior surface of the wall 28 due to the reduced transverse dimension of the bore 29. As the leading or initial threads T on the threaded member S are turned through the bore 29, they are picked-up by the deformable pilot rib 30, which in effect, snags such threads and progressively grips the threads to prevent cocking or misalignment of the threaded member S with respect to the rotational axis X of the device. As the threads T commence to turn past the rib 30, the material thereof is displaced downwardly from the side wall 28, as at 30'. This deformation of the rib causes the material thereof to bunch axially in a direction toward the end of the hub 6 which causes the side wall 28 to be drawn radially inwardly toward the rotational axis of the device as shown by the arrows in FIG. 6. Deformation of the rib material provides a considerable drag or binding action on the threads T.

As the threaded member S is continued to be turned through the bore 29 the initial threads thereon are engaged by the shoulder portion 34 which, due to its reduced transverse dimension, sets up a counter-active force which increases the resistance to downward turning movement of the threaded member. This counter-active force is transmitted to the side wall 28 and acts to progressively collapse the tubular hub 6 in an axial upward direction toward the head 4. Moreover, the frusto-conical skirt portion 24 provides, in effect, a bellows-type action to enable such axial collapsing movement of the tubular hub in a direction toward the head 4. Such axial movement of the hub 6 exerts a constant upward thrust on the material of the rib which is transmitted to the threads in the manner of a spring lock. The radial inward movement of the side wall 28 of the hub 6 due to the deformation of the pilot rib 30 causes the shoulder portion 34 to be compressed inwardly and into tight gripping engagement with the threads T on the threaded member S. This deformation of the shoulder portion 34 causes the material thereof to be jammed into engagement with the threads adjacent the leading end of the threaded member S which provides a permanent and positive lock action thereon. Moreover, because of the reduced thickness W of the shoulder portion 34, the material thereof is enabled to be disposed between adjacent threads on the threaded member to increase the gripping and locking action in the manner of a thread lock on the threaded member S in the final installed position thereof.

Accordingly, the foregoing arrangement provides combined coacting forces which include the progressive deformation of the pilot rib 30 which causes the side wall 28 of the hub 6 to be drawn radially inwardly for tightening the gripping power of the shoulder portion 34 on the threads T on the threaded member S. Simultaneously with this movement, the shoulder portion 34 sets up a counter-active force which resists turning movement of the threaded member S so as to cause the side wall 28 of the hub 6 to progressively collapse in an axial direction toward the hub. This axial collapsing movement of the hub further increases the drag or locking action of the deformable pilot rib 30 on the body of the threaded member S. Hence, in the final installed position, the side wall 28 of the tubular hub 6 is drawn into tight gripping engagement with the threaded member S substantially throughout its length. In addition, it will be seen that by this arrangement the side wall 28 is deformed so as to assume the same general contour as the outer periphery of the threaded member S indicating the effective gripping and holding power afforded by the fastening device of the invention. This combined locking action is achieved automatically without the use of auxiliary locking devices and provides a positive and durable securement of the device to the threaded member which is not subject to cross-threading upon installation or to loosening as a result of vibration under severe service conditions.

In the foregoing example the head 4 of the fastening device has been illustrated as being of a generally U-shaped configuration for attachment to a support member, such as a panel or the like. It is to be understood, however, that other forms of attachment means, such as a J-shaped, flat or the like, may be employed to provide a suitable retainer for mounting the device on a support member.

While the particular embodiments of this invention have been described and shown, it will be understood that the invention is not limited thereto, since many modifications may be made of the fastening device in accordance with the present invention. It is contemplated, therefore, by the appended claims, to cover any such modifications as may fall within the true spirit and scope of this invention.

I claim:
1. A fastening device comprising,
a head having an opening therein,
a tubular hub defined by an endless side wall extending from said head, said hub having a bore extending therethrough and being open at the end remote from said head and adapted for receiving a threaded member therein,
deformable pilot means on said hub including a rib made integral with and formed from the material of said side wall and projecting into said bore adapted for deformation upon engagement by a threaded member inserted through said bore,
and locking means including a shoulder portion extending inwardly from said side wall, said shoulder portion comprising a continuation of said side wall and defining the open end of said hub for gripping engagement with said threaded member.

2. A fastening device in accordance with claim 1, wherein
the thickness of said side wall throughout a major portion of its length is greater than the thickness of said shoulder portion.

3. A fastening device in accordance with claim 1, wherein
the bore in said hub is generally circular in transverse cross-section,
and said shoulder portion being substantially endless defining a generally circular opening adjacent the end of said hub.

4. A fastening device in accordance with claim 3, wherein
the diameter of said bore throughout a major portion of its length is substantially greater than the diameter of the opening defined by said endless shoulder portion.

5. A fastening device in accordance with claim 1, wherein
said head includes a tapered skirt portion extending downwardly therefrom, said skirt portion integrally connecting said hub to said head.

6. A fastening device in accordance with claim 5, wherein
said skirt portion includes an endless side wall defining on the interior thereof a generally inverted, frusto-conical shaped opening for receiving a threaded member therethrough.

7. A fastening device in accordance with claim 1, wherein
said head includes an attachment means adapted for securement with the marginal edge of a support member.

8. A fastening device in accordance with claim 7, wherein
said attachment means includes a resilient arm spaced from said head and connected at one end thereto by a bight portion, said arm having an opening disposed in alignment with the opening in said head for receiving a threaded member therethrough when inserted into the bore in said hub.

9. A fastening device in accordance with claim 8, wherein
said arm includes a generally arcuate depressed edge portion adjacent the margin of the opening therein, said marginal edge portion extending angularly downwardly from the general plane of said arm.

10. A fastening device in accordance with claim 1, wherein said hub includes an endless side wall, said deformable pilot means including a generally endless rib formed from and extending inwardly from said side wall, and said locking means including an inturned shoulder portion forming a continuation of said side wall and defining the opening in the end of said hub.

11. A fastening device in accordance with claim 10, wherein the maximum transverse dimension between oppositely disposed points on said rib and on said shoulder portion is substantially less than the maximum transverse dimension of a threaded member adapted to be inserted through the bore in said hub.

12. A fastening device in accordance with claim 1, wherein said head includes a base, said base being struck-out to provide a skirt portion extending from said base, and said skirt portion integrally connecting said hub to said head.

13. A fastening device in accordance with claim 12, wherein said bore includes an enlarged end section, said skirt portion being struck-out of said section, and an arcuate flange extending along a portion of the peripheral edge of said section adapted for engagement with a support member.

References Cited
UNITED STATES PATENTS

| | | | |
|---|---|---|---|
| 2,228,584 | 1/1941 | Place | 151—41.75 |
| 2,477,430 | 7/1949 | Swanstrom | 151—7 |
| 2,846,701 | 8/1958 | Bedford | 151—41.7 |
| 3,229,743 | 1/1966 | Derby | 151—41.75 |

FOREIGN PATENTS

| | | |
|---|---|---|
| 1,400,625 | 4/1965 | France. |
| 159,483 | 7/1957 | Sweden. |

MARION PARSONS, Jr., *Primary Examiner.*